(12) United States Patent
Chen

(10) Patent No.: US 7,792,424 B2
(45) Date of Patent: Sep. 7, 2010

(54) CAMERA HANDLE WITH PLASTIC LAYER AND PROTECTIVE FILM AND METHOD FOR MANUFACTURING THEREOF

(75) Inventor: I-Tzu Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 359 days.

(21) Appl. No.: 11/875,158

(22) Filed: Oct. 19, 2007

(65) Prior Publication Data

US 2009/0034961 A1 Feb. 5, 2009

(30) Foreign Application Priority Data

Jul. 30, 2007 (CN) .......................... 2007 1 0201210

(51) Int. Cl.
*G03B 17/02* (2006.01)
(52) U.S. Cl. ....................................... 396/540; 396/535
(58) Field of Classification Search ................. 396/540; 16/425; 297/183.7–183.9
See application file for complete search history.

(56) References Cited

U.S. PATENT DOCUMENTS

| | | | | |
|---|---|---|---|---|
| 4,699,486 A | * | 10/1987 | Konno et al. ................. | 396/299 |
| 5,563,674 A | * | 10/1996 | Von Holtz et al. ............ | 396/540 |
| 5,721,997 A | * | 2/1998 | Powell et al. ................ | 396/420 |
| 6,115,557 A | * | 9/2000 | Maeda et al. ................ | 396/287 |
| 6,131,993 A | * | 10/2000 | Pesta et al. ............. | 297/188.04 |
| 6,282,382 B1 | * | 8/2001 | Sakamoto et al. ........... | 396/538 |
| 6,293,449 B1 | | 9/2001 | McGuire et al. | |
| 6,402,101 B1 | * | 6/2002 | Yates ...................... | 248/118.1 |

(Continued)

FOREIGN PATENT DOCUMENTS

JP 2004-53791 A 2/2004

OTHER PUBLICATIONS

"IEDS The Plastic Web", obtained on Apr. 10, 2010 from http://web.archive.org/web/20060222162135/http://www.ides.com/generics/Silicone.htm, effective date of Feb. 22, 2006.*
"Application of Silicone products", obtained on Apr. 10, 2010 from http://www.szlhf.com/en/newsdetail.asp?id=80.*

*Primary Examiner*—W. B. Perkey
*Assistant Examiner*—Bret Adams
(74) *Attorney, Agent, or Firm*—Jeffrey T. Knapp

(57) ABSTRACT

A camera handle includes an underplate, a plastic layer and a protective film. The protective film enwraps the plastic layer and is fixed on the underplate. A method for manufacturing the camera handle includes the following steps: fixing a protective film on an underplate, the underplate defining a plurality of through holes uncovered on a glue side of the underplate by the protective film during the protective film draped over the side of the underplate; positioning the sub-assembly of the protective film and the underplate in a tool that defines a concave portion and at least one air channel thereof, wherein, the protective film is adjacent the air channel; pumping air via the air channel for forming a space between the protective film and the underplate; filling the space with the plastic layer via the through holes; sealing the through holes.

6 Claims, 13 Drawing Sheets

U.S. PATENT DOCUMENTS

| | | | |
|---|---|---|---|
| 6,837,630 B2 * | 1/2005 | Horiguchi | 396/502 |
| 7,332,214 B2 * | 2/2008 | Ozasa et al. | 428/317.1 |
| 7,634,839 B2 * | 12/2009 | Blauer et al. | 16/431 |
| 2005/0215717 A1 * | 9/2005 | Dozeman | 525/192 |
| 2006/0262274 A1 * | 11/2006 | Brown et al. | 352/243 |
| 2008/0018782 A1 * | 1/2008 | Terakado et al. | 348/376 |

* cited by examiner

Fixing a protective film on an underplate, the underplate defining a plurality of through holes not covered by the protective film

↓

Positioning the sub-assembly of the protective film and the under plate in a tool having a cancave portion and at least one air channel thereof, te protective film adjacent the air channel

↓

Pumping air via the air channel for forming a space between the protective film and the under plate

↓

Filling the space with a plastic layer via the through holes

↓

Sealing the through holes

FIG. 3

CAMERA HANDLE WITH PLASTIC LAYER AND PROTECTIVE FILM AND METHOD FOR MANUFACTURING THEREOF

FIELD OF THE INVENTION

The present invention relates to the art of a handle and, particularly, to a camera handle for protecting a camera from vibration during picture taking and method for manufacturing same.

DESCRIPTION OF THE RELATED ART

Cameras are becoming smaller, thinner, and with improved function. However, blurred images remain a problem, and in fact may be a greater problem than before, because vibrations during picture taking are easier to occur due to the smaller sizes of the cameras making it difficult for users to hold their camera steady.

There is a heretofore unaddressed need in the industry to provide a camera handle and method of manufacturing thereof for raising holding reliability.

SUMMARY OF THE INVENTION

In accordance with a present embodiment, a camera handle includes an underplate, a plastic layer and a protective film. The protective film enwraps the plastic layer and is fixed on the underplate.

In accordance with another present embodiment, a method for manufacturing a camera handle includes the following steps: fixing a protective film on an underplate, the underplate defining a plurality of through holes not covered by the protective film; positioning the sub-assembly of the protective film and the underplate in a tool that has a concave portion and at least one air channel, wherein, the protective film is adjacent the air channel; pumping air via the air channel for forming a space between the protective film and the underplate; filling the space with a plastic layer via the through holes; sealing the through holes.

The camera handle is made of malleable plastic materials, and can be manually shaped to hands of the users for better stability when holding the camera, for better quality pictures.

BRIEF DESCRIPTION OF THE DRAWINGS

FIG. 3 is a flow chart of a method for manufacturing the camera handle of the first preferred embodiment;

DESCRIPTION OF THE PREFERRED EMBODIMENT

Figure 1:
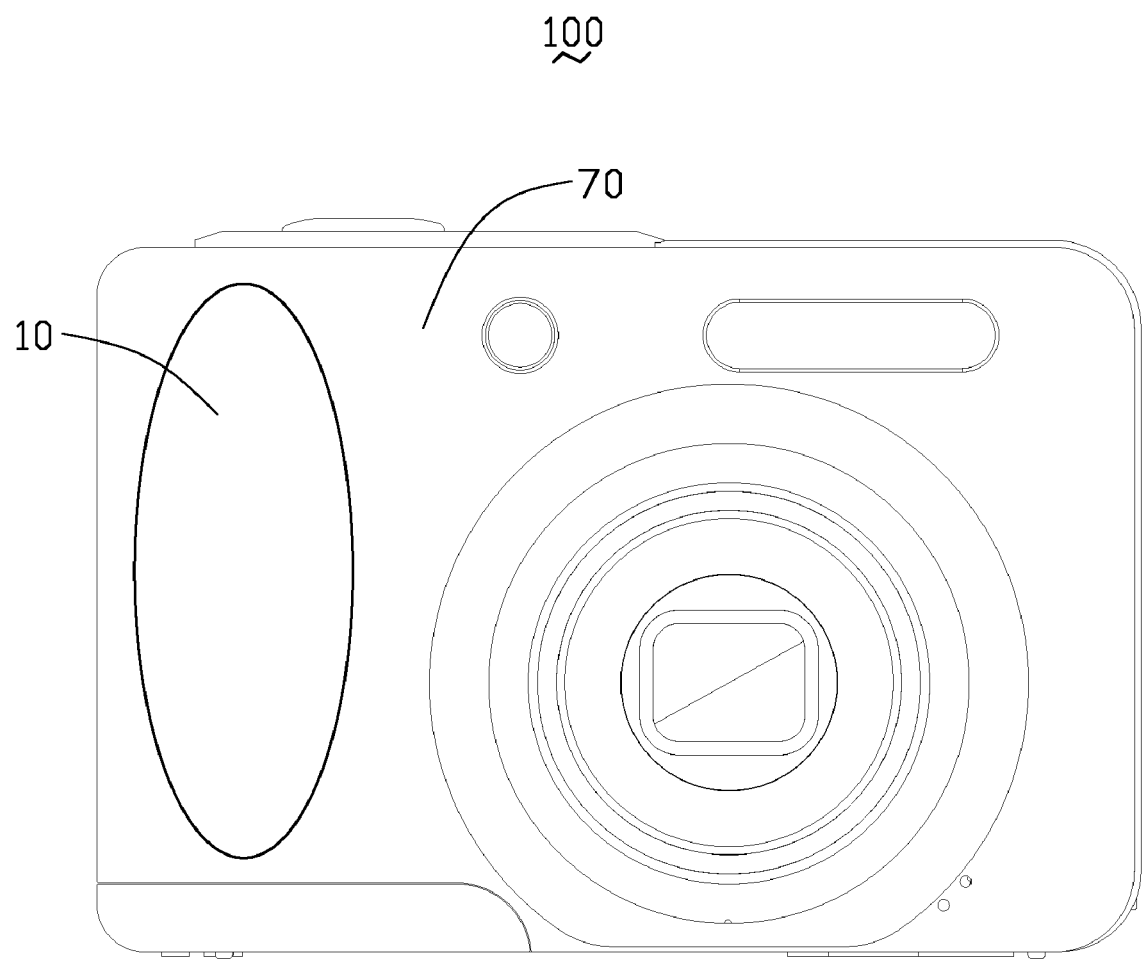
FIG. 1 is a schematic of a camera handle positioned on a housing of a camera in accordance with a first preferred embodiment.
Figure 2:
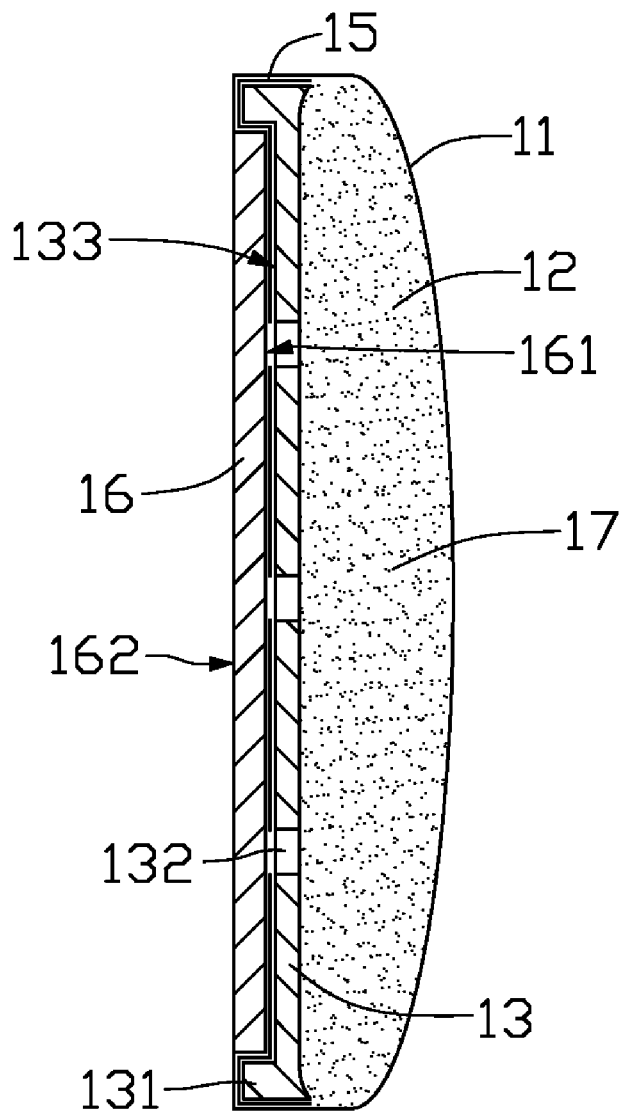
FIG. 2 is a cross-sectional view of the camera handle of FIG. 1.
Figure 4:
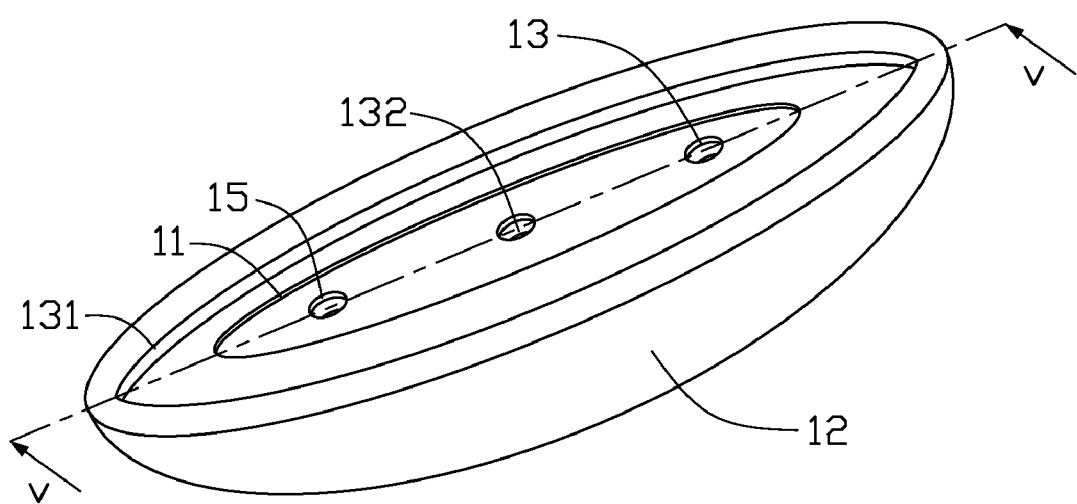
FIG. 4 is a perspective view of a glue layer and a protective film mounted on an underplate of the camera handle of the first preferred embodiment.
Figure 5:
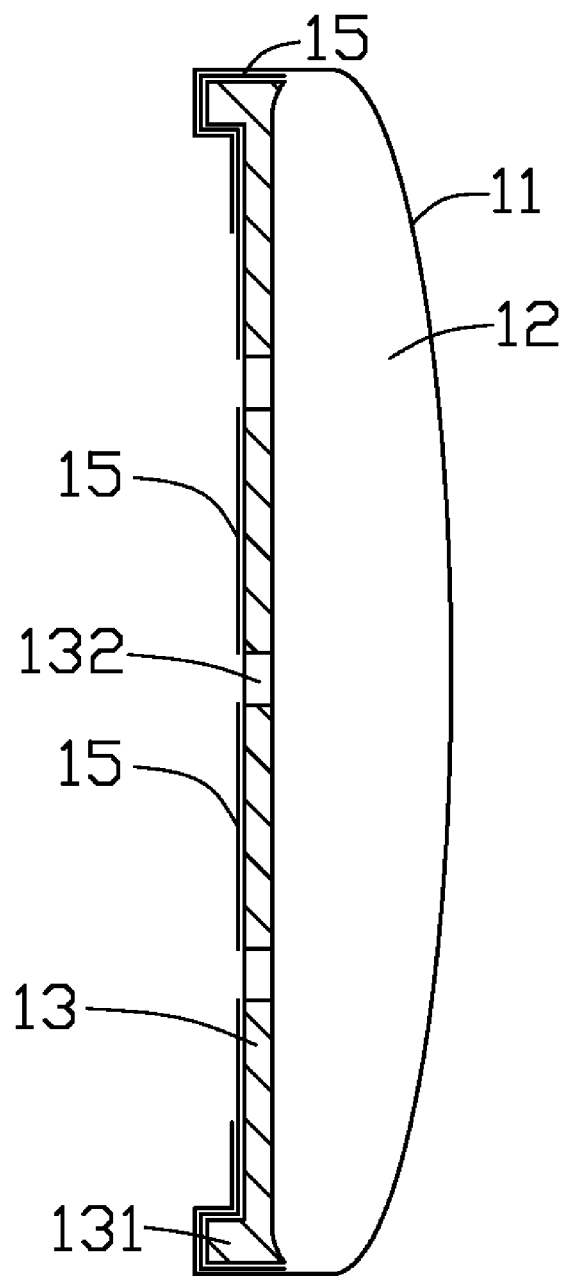
FIG. 5 is a cross-sectional view of FIG. 4 along line V-V.

Embodiments of the present camera handle and method for manufacturing thereof will now be described in detail below with reference to the drawings.

Referring to FIGS. 1-6, a camera handle 10, in accordance with a first preferred embodiment, has a semi-ellipse shape and is fixed on a housing 70 of a camera 100. The camera handle 10 includes an underplate 13, a glue layer 15, a protective film 11, a plastic layer 17, and a back plate 16.

The underplate 13 includes a mounting surface 133 and a flange 131 perpendicularly extending upward from a periphery of the underplate 13. A space is formed by the mounting surface 133 and the flange 131. The underplate 13 further defines at least one through hole 132 on the mounting surface 133. In fact, the flange 131 can also be a plurality of projections 131 perpendicularly extending upward from the periphery of the underplate 13.

The glue layer 15 can, for example, be made from a resin or double-sided tape. In the first embodiment, the glue layer 15 is adhered to both the flange 131 and the mounting surface 133.

The protective film 11 can be advantageously formed from plastic silica gel. The protective film 11 is draped over the side of the underplate 13 where the plastic layer 17 will be formed, and the edge of the protective film 11 passes over the flange 131 to be fixed to the mounting surface 133 by the glue layer 15, leaving the through holes 132 uncovered on the glue side of the underplate 13. A length of the protective film 11 is much greater than that of the underplate 13 so that a space 12 can be formed between the protective film 11 and the underplate 13 for forming the plastic layer 17 therein.

The plastic layer 17 is made from powder materials which can be calcium carbonate powder, or titanium dioxide powder, or combination of the both, or other material. The plastic layer 17 is formed by fully filling the space 12 through the through holes 132 of the underplate 13.

The back plate 16 defines a first surface 161 cooperating with the mounting surface 133 and a second surface 162 opposite to the first surface 161. The back plate 16 is configured to fit in the cavity formed between the mounting surface 133 and the flange 131. Optimally, a length of the back plate 16 is equal to that of the mounting surface 133, and a height of the back plate 16 is equal to that of the flange 131 of the underplate 13. The back plate 16 is positioned on the mounting surface 133 via the glue layer 15 adhered on both the first surface 161 and the mounting surface 133. It is noted that the back plate 16 covers the through holes 132 of the underplate 13. The camera handle 10 can be fixed to the housing 70 by the glue layer 15 disposed on the second surface 162. Of course, the camera handle 10 can also be fixed on the housing 70 by other means.

Figure 6:
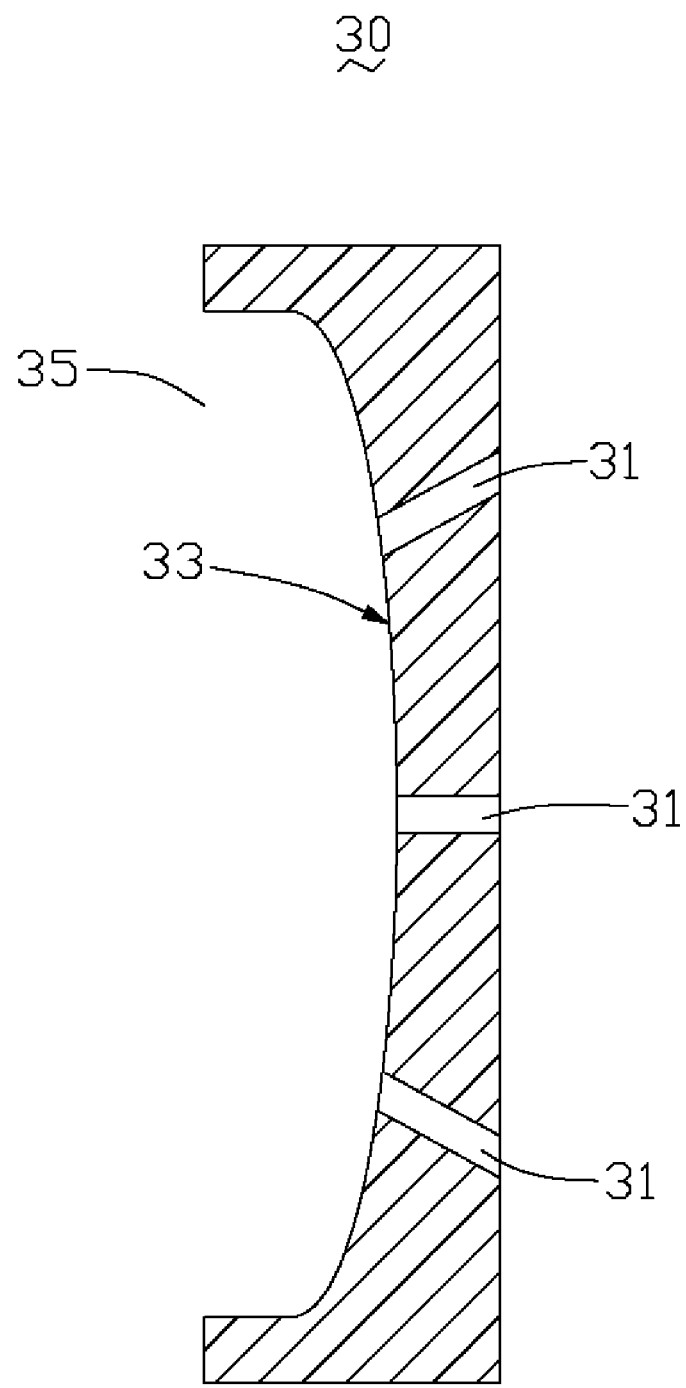
FIG. 6 is a cross-sectional view of a tool for manufacturing the camera handle of the first preferred embodiment.
Figure 7:
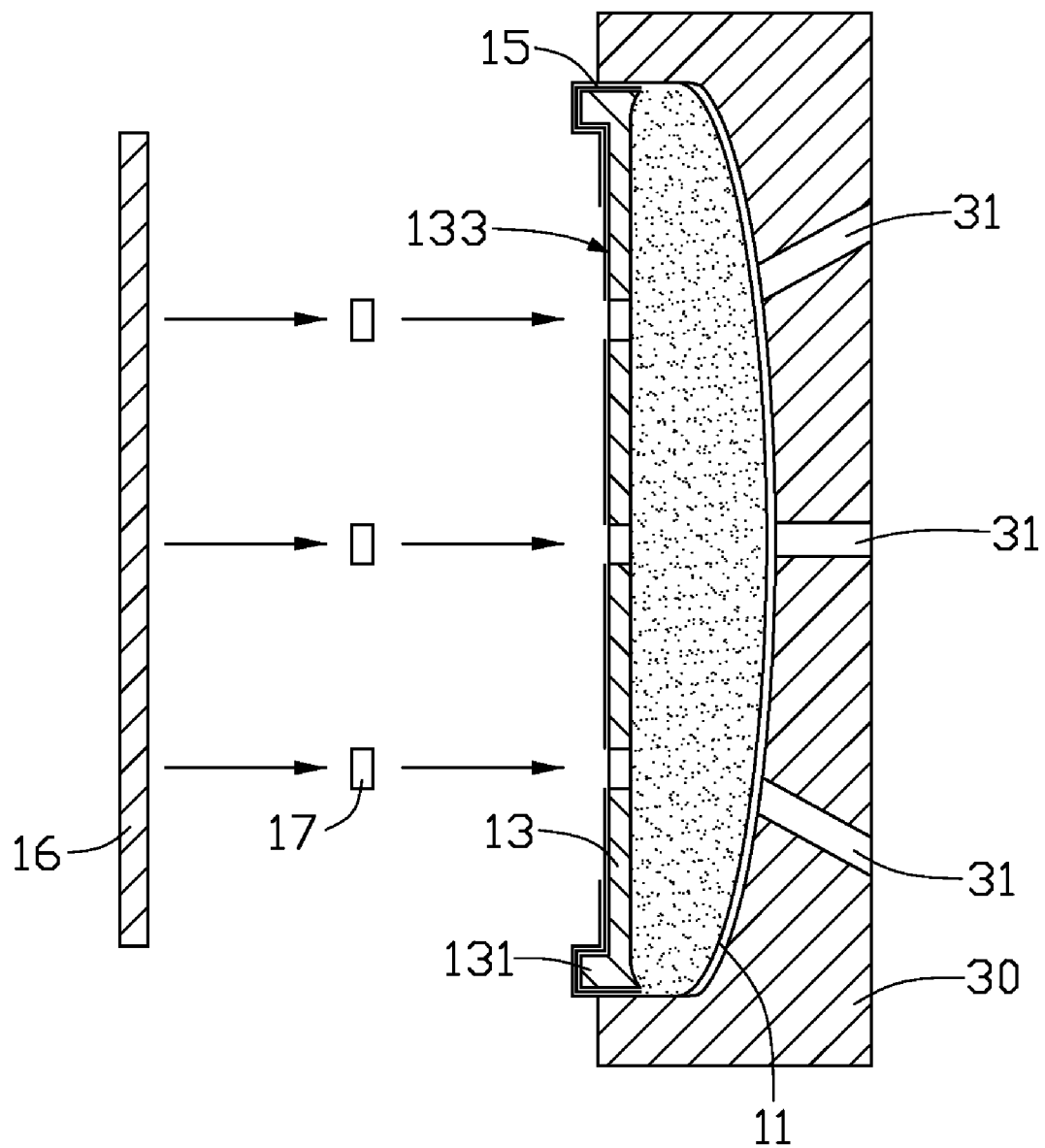
FIG. 7 is a cross-sectional view of a back plate mounted onto the underplate of the camera handle of the first preferred embodiment.

Referring to FIGS. 3 and 6-7, a manufacturing method of the camera handle of the first embodiment is described. The method includes the following steps: Fixing the protective film 11 which has a length much greater than that of the underplate 13 on the underplate 13 via the glue layer 15, the underplate 13 defining a plurality of through holes 132 uncovered by and the glue layer 15 from the mounting surface 13 view; positioning the sub-assembly of the protective film 11 and the underplate 13 in a concave portion 35 of a tool 30 that defines at least one air channel 31 through the concave portion 35, wherein, the protective film 11 is adjacent a concave surface 33 of the concave portion 35 communicating with the air channel 31; pumping air accumulated in the concave portion 35 out via the air channel 31 which results in the protective film 11 moving away from the underplate 13 under air pressure thereby forming the space 12 between the protective film 11 and the underplate 13; filling the space 12 with the plastic layer 17 via the through holes 132; sealing the through holes 132; fixing the back plate 16 on the mounting surface 133 of the underplate 13 and fixing the camera handle 10 on the housing 70 by virtue of the back plate 16. Alternatively, the camera handle 10 can also be fixed on the housing 70 directly by the underplate 13.

Figure 8:
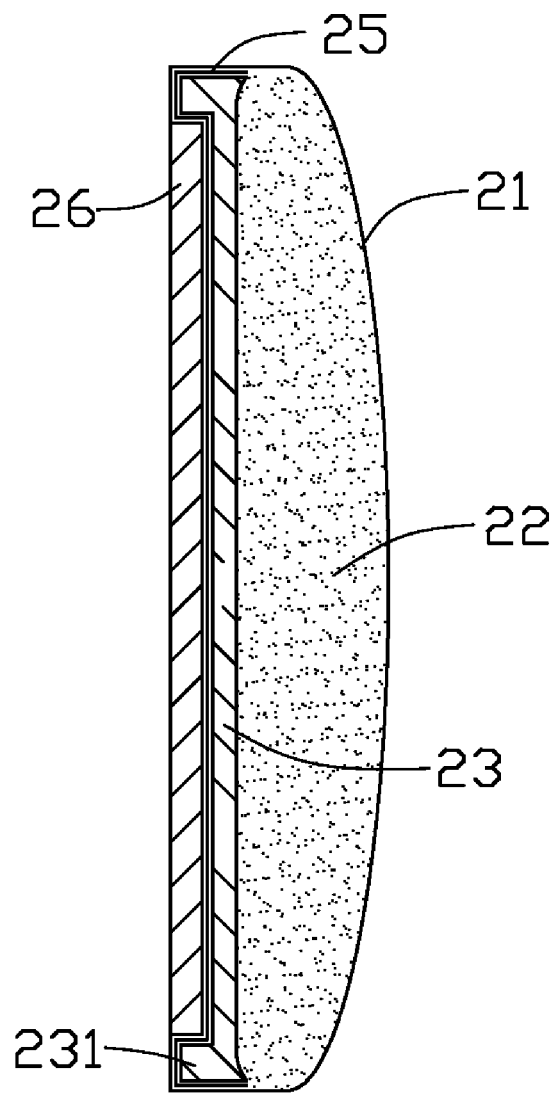
FIG. 8 is a cross-sectional view of a camera handle in accordance with a second preferred embodiment.
Figure 9:
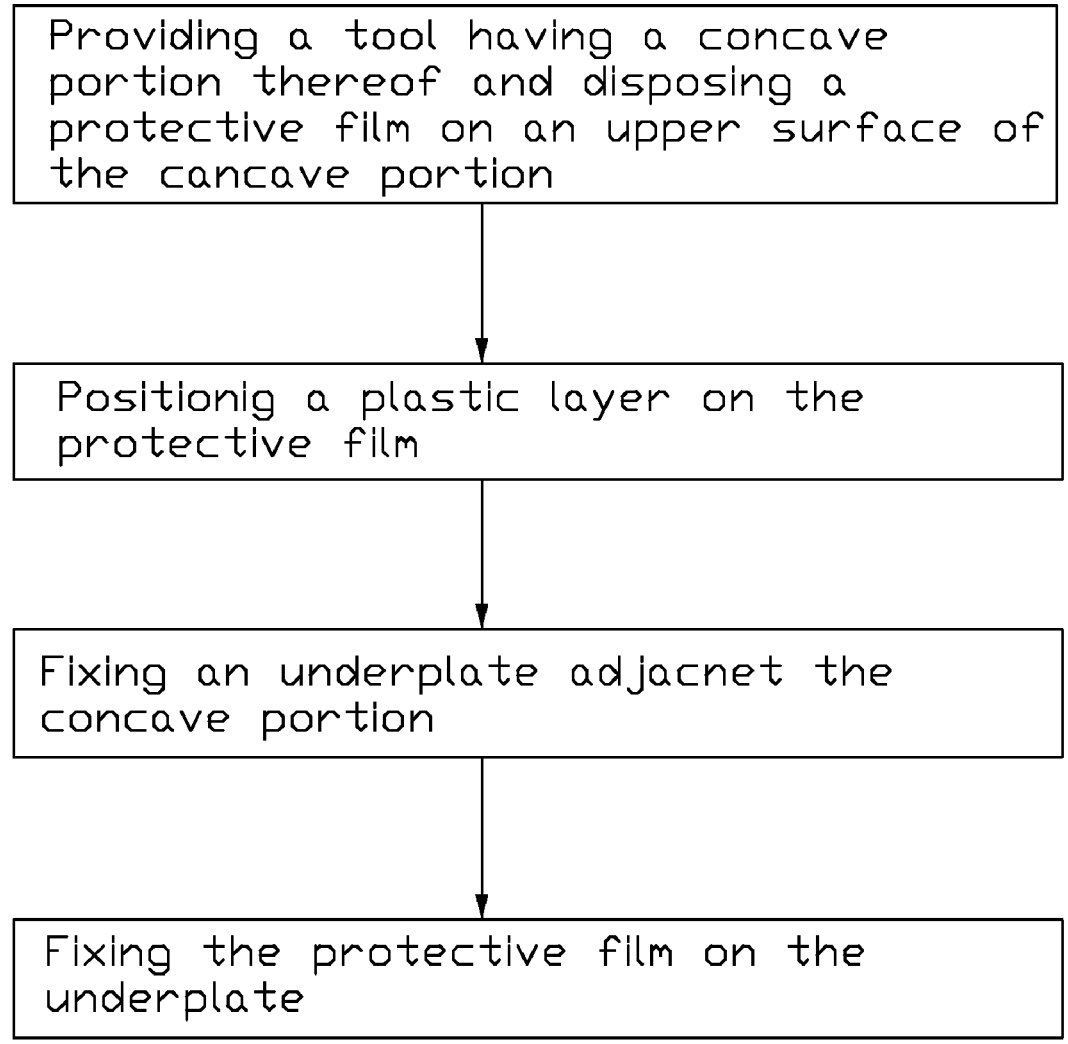
FIG. 9 is a flow chart of a method for assembling the camera handle of the second preferred embodiment.
Figure 10:
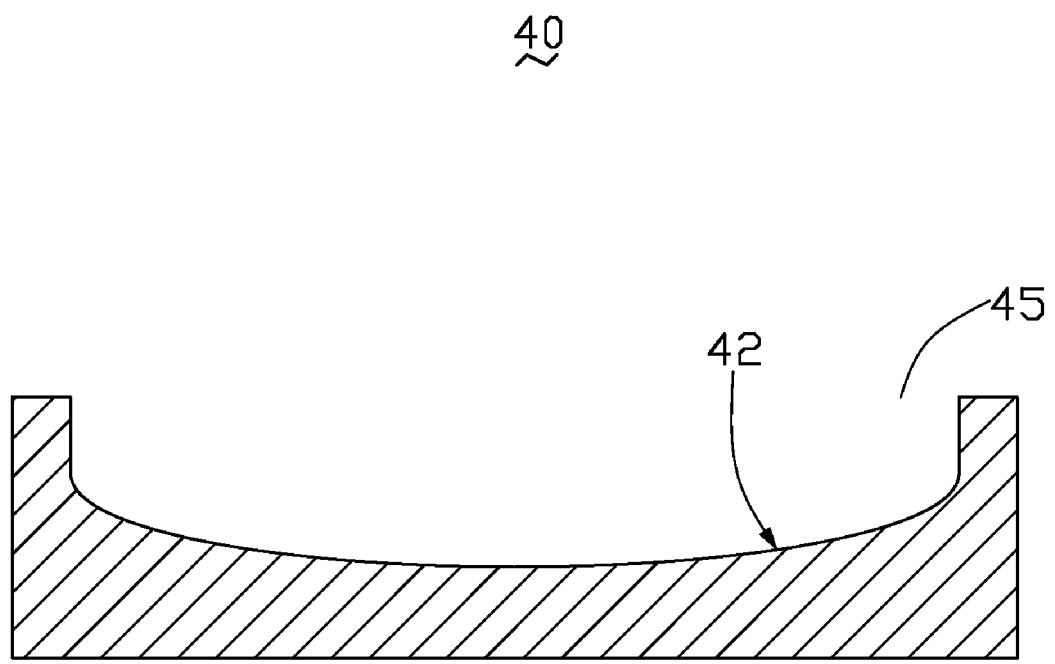
FIG. 10 is a cross-sectional view of a tool for manufacturing the camera handle of the second preferred embodiment.
Figure 11:
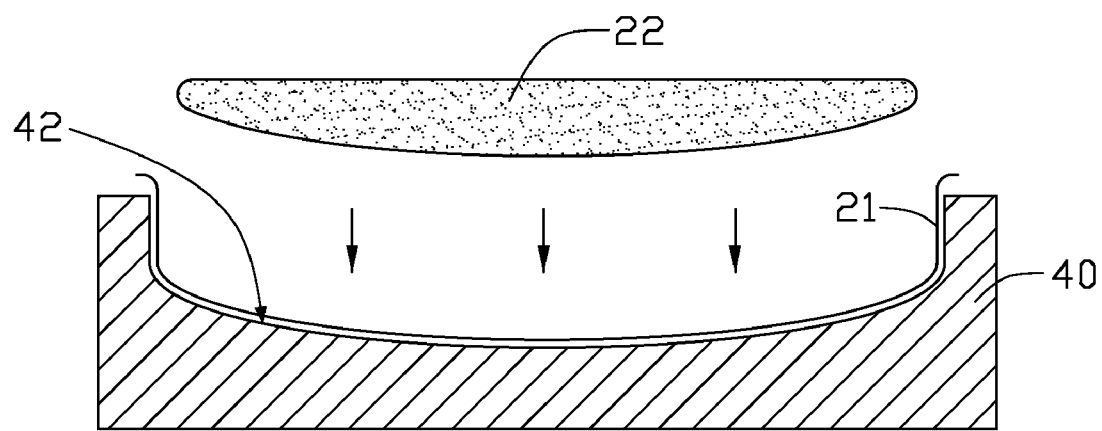
FIG. 11 is a cross-sectional view of a plastic layer assembled with a protective film of the camera handle of the second preferred embodiment.
Figure 12:
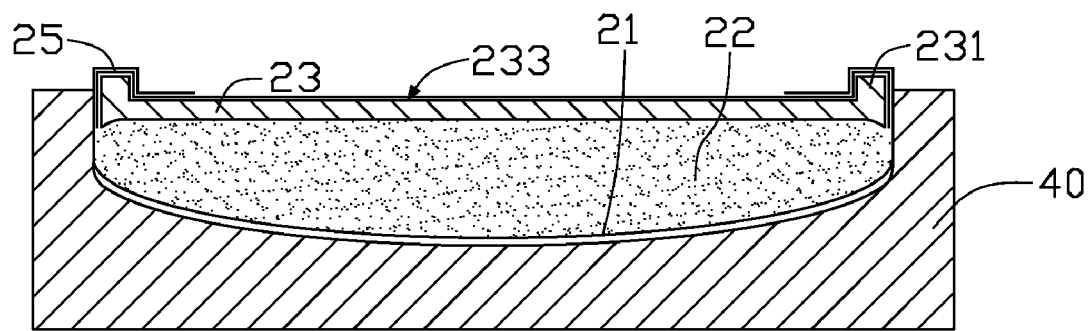
FIG. 12 is a cross-sectional view of the plastic layer assembled with the protective film and an underplate of the camera handle of the second preferred embodiment.
Figure 13:
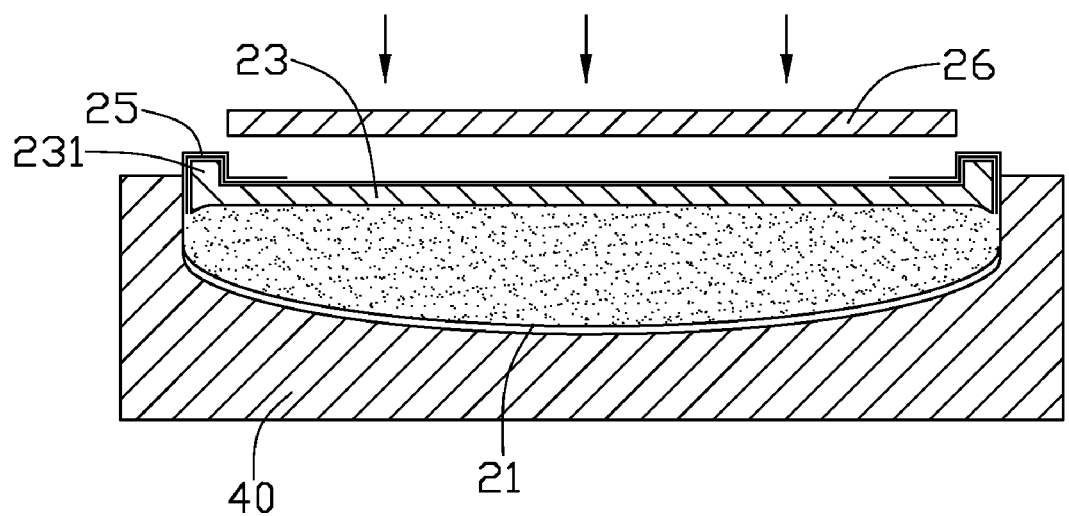
FIG. 13 is a cross-sectional view of the underplate assembled with a back plate of the camera handle of the second preferred embodiment.

Referring to FIG. 8, a camera handle 20, in accordance with a second preferred embodiment, is similar to that of the first embodiment. In this embodiment, The plastic layer 22 is made of inert foam, and the underplate 23 does not define through holes therein. The plastic layer 22 is enwrapped by the protective film 21 and the protective film 21 is fixed to the underplate 23 by the glue layer 25. The underplate 23 defines a flange 231 for forming a space to receive the back plate 26. The camera handle 20 can be mounted on the housing 70 by the glue layer 25 disposed on the back plate 26.

Referring to FIGS. 9-13, a method for manufacturing the camera handle 20 of the second embodiment includes the following steps: providing a tool 40 having a concave portion 45; disposing the protective film 21 on an upper surface 42 of the concave portion 45; positioning the plastic layer 22 made of inert foam on the protective film 21; placing the underplate 23 on the plastic layer 22 in the concave portion 45, a length of the underplate 23 being substantially equal to that of the plastic layer 22 such that the underplate 23 substantially covers the plastic layer 22; fixing the protective film 21 on the underplate 23 by the glue layer 25, attaching the back plate 26 to the mounting surface 233 of the underplate 23 by the glue layer 25.

The plastic layer 17, 22 and the protective layer 11, 21 of the camera handle is made of malleable plastic materials, and can be manually shaped to hands of the users for better stability when holding the camera, by which, better quality of the picture is raised accordingly.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A camera handle for a camera, comprising an underplate, a plastic layer disposed at a side of the underplate, and a protective film, wherein the protective film enwraps the plastic layer together with the underplate and is fixed on the underplate to thereby fix the plastic layer to the underplate; the underplate defines a flange perpendicularly extending from a periphery thereof in a direction away from the plastic layer; the protective film passes over the flange; a back plate fits in a space formed by the flange and the underplate, and is configured to attach the camera handle to the camera.

2. The camera handle as claimed in claim 1, wherein the protective film is formed from plastic silica gel.

3. The camera handle as claimed in claim 1, further comprising a glue layer configured for positioning the protective film on the underplate, the protective film extending beyond the periphery of the underplate to an opposite side of the underplate away from the plastic layer.

4. The camera handle as claimed in claim 3, wherein the underplate defines at least one through hole uncovered on a glue side of the underplate, where the glue layer is positioned, by the protective film during the protective film draped over the side of the underplate, to allow the plastic layer being filled into a space formed between the underplate and the protective film.

5. The camera handle as claimed in claim 4, wherein the plastic layer is made from powder materials selected from calcium carbonate powder, titanium dioxide powder, and a combination of the both.

6. The camera handle as claimed in claim 3, wherein the plastic layer is made from inert foam.

* * * * *